United States Patent
Ozluturk et al.

(10) Patent No.: US 8,531,938 B2
(45) Date of Patent: *Sep. 10, 2013

(54) TRANSMIT PROCESSING USING RECEIVER FUNCTIONS

(75) Inventors: Fatih M Ozluturk, Port Washington, NY (US); Kyle Jung-Lin Pan, Smithtown, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/552,831

(22) Filed: Sep. 2, 2009

(65) Prior Publication Data

US 2009/0323775 A1  Dec. 31, 2009

Related U.S. Application Data

(63) Continuation of application No. 10/335,347, filed on Dec. 31, 2002, now Pat. No. 7,593,357.

(60) Provisional application No. 60/396,490, filed on Jul. 17, 2002, provisional application No. 60/368,639, filed on Mar. 28, 2002.

(51) Int. Cl.
*H04J 11/00* (2006.01)

(52) U.S. Cl.
USPC .............................. 370/203; 370/342; 375/296

(58) Field of Classification Search
None
See application file for complete search history.

(56) References Cited

U.S. PATENT DOCUMENTS

| 5,224,122 | A | 6/1993 | Bruckert |
| 5,550,810 | A | 8/1996 | Monogioudis et al. |
| 5,881,108 | A | 3/1999 | Herzberg et al. |
| 6,011,812 | A | 1/2000 | Laakso et al. |
| 6,044,083 | A * | 3/2000 | Citta et al. ............... 370/441 |
| 6,175,588 | B1 | 1/2001 | Visotsky et al. |
| 6,233,273 | B1 | 5/2001 | Webster et al. |
| 6,233,454 | B1 | 5/2001 | Sato |
| 6,314,147 | B1 | 11/2001 | Liang et al. |
| 6,473,467 | B1 | 10/2002 | Wallace et al. |
| 6,741,643 | B1 | 5/2004 | McGibney |
| 6,959,047 | B1 | 10/2005 | Al-Dhahir |

(Continued)

FOREIGN PATENT DOCUMENTS

| CA | 2 396 571 | 7/2001 |
| CN | 1106094 C | 4/2003 |

(Continued)

OTHER PUBLICATIONS

Choi, "Interference Mitigation Using Transmitter Filters in CDMA Systems," The 12$^{th}$ IEEE International Symposium on PIMRC 2001, vol. 1, pp. 30-34.

(Continued)

*Primary Examiner* — Kevin C Harper
(74) *Attorney, Agent, or Firm* — Volpe and Koenig, P.C.

(57) ABSTRACT

A method and apparatus for transmitting data in code division multiple access communications. The method includes processing spread first data with a channel response matrix using an equalization circuit to pre-equalize the spread data to compensate for a channel response prior to transmission. The pre-equalized data is received and recovered by a receiver. Second data, transmitted from the receiver, is received and recovered using the equalization circuit to equalize the second data to compensate for a channel response that the first data encountered.

6 Claims, 1 Drawing Sheet

(56) References Cited

U.S. PATENT DOCUMENTS

| | | |
|---|---|---|
| 7,154,935 B1 | 12/2006 | Kowalewski et al. |
| 7,593,357 B2* | 9/2009 | Ozluturk et al. ............ 370/310 |
| 2001/0017881 A1 | 8/2001 | Bhatoolaui et al. |
| 2002/0060990 A1 | 5/2002 | Bohnke et al. |
| 2002/0061005 A1* | 5/2002 | Lee et al. ................. 370/342 |
| 2002/0126741 A1 | 9/2002 | Baum et al. |
| 2002/0159537 A1* | 10/2002 | Crilly, Jr. ................. 375/267 |
| 2002/0160731 A1 | 10/2002 | Hashimoto et al. |
| 2002/0173286 A1 | 11/2002 | Lindoff et al. |
| 2002/0177447 A1 | 11/2002 | Walton et al. |
| 2003/0026348 A1 | 2/2003 | Llang et al. |
| 2003/0081656 A1 | 5/2003 | Buehrer |
| 2003/0108117 A1 | 6/2003 | Ketchum et al. |
| 2004/0196892 A1* | 10/2004 | Reznik ..................... 375/148 |

FOREIGN PATENT DOCUMENTS

| | | |
|---|---|---|
| EP | 0 180 066 | 5/1986 |
| JP | 52-006011 | 1/1977 |
| JP | 63-279623 | 11/1988 |
| JP | 1051424 | 2/1998 |
| JP | 11-266232 | 9/1999 |
| JP | 2000-224076 | 8/2000 |
| JP | 2001-267989 | 9/2001 |
| JP | 2001-520492 | 10/2001 |
| JP | 2002-374224 | 12/2002 |
| TW | 355892 | 4/1999 |
| WO | 92/16054 A1 | 9/1992 |
| WO | 95/09493 A1 | 4/1995 |
| WO | 99/20061 | 4/1999 |
| WO | 00/01092 | 1/2000 |

OTHER PUBLICATIONS

Kang, Shao-Ii et al., Comparison of ZF-BLE and MMSE-BLE in TD-SCDMA System, Oct. 29, 2001.

Kowaleski et al. "Joint Predistortion and Transmit Diversity." IEEE, Nov. 27, 2000. pp. 245-249.

Lee, Edward A., "Digital Communications" $2^{nd}$ Edition, 1994, Kluwer Academic Publishers, pp. 460-464.

Rappaport, "Equalization, Diversity and Channel Coding", *Wireless Communication—Principles and Practice*, Chapter 6, pp. 299-324, 2002.

Wang et al., "Wireless Multicarrier Communications Where Fourier Meets Shannon," IEEE Signal Processing Magazine, vol. 17, No. 3, (May 2000).

* cited by examiner

TRANSMIT PROCESSING USING RECEIVER FUNCTIONS

CROSS REFERENCE TO RELATED APPLICATIONS

This application is a continuation of U.S. patent application Ser. No. 10/335,347 filed on Dec. 31, 2002,which claims the benefit of U.S. Provisional Application No. 60/396,490 filed on Jul. 17, 2002,and U.S. Provisional Application No. 60/368,639 filed on Mar. 28, 2002,which are incorporated by reference as if fully set forth.

FIELD OF INVENTION

The application is related to wireless communications.

BACKGROUND

In code division multiple access (CDMA) communication systems, multiple communications may be simultaneously sent over a shared frequency spectrum. Each communication is distinguished by the code used to transmit the communication.

In some CDMA communication systems, to better utilize the shared spectrum, the spectrum is time divided into frames having a predetermined number of time slots, such as fifteen time slots. This type of system is referred to as a hybrid CDMA/time division multiple access (TDMA) communication system. One such system, which restricts uplink communications and downlink communications to particular time slots, is a time division duplex communication (TDD) system.

One approach to receive the multiple communications transmitted within the shared spectrum is joint detection. In joint detection, the data from the multiple communications is determined together. In the following description a capitalized symbol X represents a matrix, and the symbol $\vec{x}$ represents a column vector. The joint detection is typically modeled per Equation 1:

$$\vec{r} = A\vec{d} + \vec{n};  \quad \text{Equation 1}$$

The received signal vector $\vec{r}$ is a function of the system transmission matrix A, the transmittal data vector $\vec{d}$, and the noise vector $\vec{n}$. The system transmission matrix A contains the contributions of individual users as per Equation 2:

$$A = [A^{(1)}, A^{(2)}, \ldots, A^{(K)}]; \quad \text{Equation 2}$$

where $A^{(k)}$ represents the contribution of user k to the system transmission matrix A. Each user system transmission matrix is a function of the channel impulse response and the spreading code of that user per Equation 3:

$$A^{(k)} = H^{(k)} C^{(k)}; \quad \text{Equation 3}$$

Where $H^{(k)}$ is the channel response matrix and $C^{(k)}$ is the code matrix for user k.

A Minimum Mean Square Error (MMSE) estimate for the data vector $\hat{\vec{d}}$ is obtained from Equation 4:

$$\hat{\vec{d}} = (A^H R_n^{-1} A)^{-1} A^H R_n^{-1} \vec{r}; \quad \text{Equation 4}$$

where $R_n$ is the covariance matrix of the noise. When the noise is white, $R_n$ is a diagonal matrix and the MMSE estimate for the data is per Equations 5A and 5B:

$$\hat{\vec{d}} = (A^H A + \sigma^2 I)^{-1} A^H \vec{r}; \quad \text{Equation 5A}$$

which may alternatively be written as:

$$\hat{\vec{d}} = A^H (AA^H + \sigma^2 I)^{-1} \vec{r}; \quad \text{Equation 5B}$$

Equations 5A and 5B are interchangeable using matrix inversion lemma.

Similarly, a zero forcing (ZF) estimate is obtained from Equations 6A and 6B:

$$\hat{\vec{d}} = (A^H A)^{-1} A^H \vec{r}; \quad \text{Equation 6A}$$

which may also be written as:

$$\hat{\vec{d}} = A^H (AA^H)^{-1} \vec{r}; \quad \text{Equation 6B}$$

Equations 6A and 6B are interchangeable using matrix inversion lemma.

In a CDMA system, when all codes go through the same propagation channel, as in the case of a typical downlink transmission or when one uplink user monopolizes a time slot ($H^{(k)} = H$) the transmitted vector of spread symbols $\vec{s}$ are obtained from Equation 7:

$$\vec{s} = C\vec{d} = \sum_{k=1}^{K} C^{(k)} \vec{d}^{(k)}; \quad \text{Equation 7}$$

The received signal is modeled using Equation 8:

$$\vec{r} = H\vec{s} + \vec{n}; \quad \text{Equation 8}$$

The MMSE estimate for the spread symbols $\vec{s}$ is obtained as shown in Equations 9A and 9B:

$$\hat{\vec{s}} = (H^H H + \sigma^2 I)^{-1} H^H \vec{r}; \quad \text{Equation 9A}$$

or equivalently:

$$\hat{\vec{s}} = H^H (HH^H + \sigma^2 I)^{-1} \vec{r} \quad \text{Equation 9B}$$

Equations 9A and 9B are interchangeable using matrix inversion lemma. The ZF estimate, (derived from Equation 6) for $\vec{s}$ is obtained by Equations 10A and 10B:

$$\hat{\vec{s}} = (H^H H)^{-1} H^H \vec{r};\qquad \text{Equation 10A}$$

or equivalently:

$$\hat{\vec{s}} = H^H (H H^H)^{-1} \vec{r};\qquad \text{Equation 10B}$$

Equations 10A and 10B are interchangeable using matrix inversion lemma. The estimate of the spread symbols $\hat{\vec{s}}$ can be followed by a code Matched Filter (MF) to recover the data symbols.

When multiple antennas are used at the receiver, the received vector may also be represented by Equation 1. The definition of the vectors and matrix involved are modified to represent the contributions from different antennas as per Equation 11:

$$\begin{bmatrix} \vec{r}_1 \\ \vdots \\ \vec{r}_N \end{bmatrix} = \begin{bmatrix} A_1 \\ \vdots \\ A_N \end{bmatrix} \vec{d} + \begin{bmatrix} \vec{n}_1 \\ \vdots \\ \vec{n}_N \end{bmatrix};\qquad \text{Equation 11}$$

where $\vec{r}_i$, $A_i$, and $\vec{n}_i$ are the terms associated with receive antenna element i. $A_i$ is constructed for each antenna with a different channel response per Equation 3 and A has components associated with each of K users per Equation 12:

$$A = [A^{(1)}, A^{(2)}, \ldots, A^{(K)}];\qquad \text{Equation 12}$$

When multiple transmit antenna elements, such as M transmit elements, are used at the transmitter, the received vector $\vec{r}_i$ is also per Equation 1. The appropriate definition of the vectors and matrix involved is represented in Equation 13:

$$\vec{r} = [A'_1 \ldots A'_M] \begin{bmatrix} \vec{d}_1 \\ \vdots \\ \vec{d}_M \end{bmatrix} + \vec{n};\qquad \text{Equation 13}$$

where $\vec{r}$ is the composite received signal, and $A'_m$, m=1, 2, ..., M is the system transmission matrix for signal transmission from the $m^{th}$ transmit element to the receiver, $\vec{d}_m$, m=1, 2 ... M is the data vector transmitted from transmit antenna m.

The components of A due to an $i^{th}$ antenna element is denoted as $A_i'$. Each $A_i'$ component has contributions from all K users per Equation 14:

$$A' = [A^{(1)}, A^{(2)}, \ldots, A^{(K)}];\qquad \text{Equation 14}$$

The contribution of each user to each antenna element is a function of the channel impulse response and the spreading (derived from Equation 3) codes as shown in Equation 15:

$$A^{(k)} = H^{(k)} C^{(k)};\qquad \text{Equation 15}$$

Multiple antennas at both the transmitter and the receiver are referred to as a Multiple Input Multiple Output (MIMO) system. The received signal for a MIMO system may be represented by Equation 11 rewritten as Equation 16.

$$\begin{bmatrix} \vec{r}_1 \\ \vdots \\ \vec{r}_N \end{bmatrix} = \begin{bmatrix} A_1 \\ \vdots \\ A_N \end{bmatrix} [A'_1 \ldots A'_M] \begin{bmatrix} \vec{d}_1 \\ \vdots \\ \vec{d}_M \end{bmatrix} + \begin{bmatrix} \vec{n}_1 \\ \vdots \\ \vec{n}_N \end{bmatrix};\qquad \text{Equation 16}$$

Where N is the number of receive antennas; M is the number of transmit antennas; $A_n$, n=1,2, ..., N is the transmission matrix for reception; and $A'_m$, m=1, 2, ..., M is the transmission matrix for transmission. With appropriate definitions of vectors and matrices involved, Equation 16 is rewritten as Equation 17:

$$\vec{r} = \Lambda \vec{d} + \vec{n};\qquad \text{Equation 17}$$

where $\Lambda$ is the composite system transmission matrix for both transmission and reception. The MMSE estimate for the data vector shown in Equation 5 is represented by Equations 18A and 18B:

$$\hat{\vec{d}} = (\Lambda^H \Lambda + \sigma^2 I)^{-1} \Lambda^H \vec{r};\qquad \text{Equation 18A}$$

or equivalently $$\hat{\vec{d}} = \Lambda^H (\Lambda \Lambda^H + \sigma^2 I)^{-1} \vec{r}\qquad \text{Equation 18B}$$

Equations 18A and 18B are interchangeable using matrix inversion lemma. The ZF estimate can be obtained from Equations 19A and 19B:

$$\hat{\vec{d}} = (\Lambda^H \Lambda)^{-1} \Lambda^H \vec{r};\qquad \text{Equation 19A}$$

or equivalently:

$$\hat{\vec{d}} = \Lambda^H (\Lambda \Lambda^H)^{-1} \vec{r};\qquad \text{Equation 19B}$$

Equations 19A and 19B are interchangeable using matrix inversion lemma.

A receiver implementing these approaches effectively performs a matrix inversion, which has a high complexity. To reduce the complexity, an approximate Cholesky decomposition or fast Fourier transforms are used. Although these approaches reduce the receiver complexity, it is desirable to have alternate approaches to simplify the transmitting and receiving of data.

SUMMARY

A channel response is determined as a channel response matrix H approximating a wireless channel that the data will experience after transmission. The data to be transmitted is spread, and the spread data is processed with the channel response matrix H. The spread and processed data is then transmitted. The data is received and recovered from the transmitted spread and processed data.

DETAILED DESCRIPTION

A system is described herein in conjunction with a time division duplex (TDD) mode of a CDMA system, (such as the proposed TDD mode of the third generation partnership project (3GPP) wideband CDMA system). However, the following can be applied to any spread spectrum communication system, such as frequency division duplex (FDD) system or a time division synchronous code division multiple access (TD-SCDMA) system.

Figure 1:
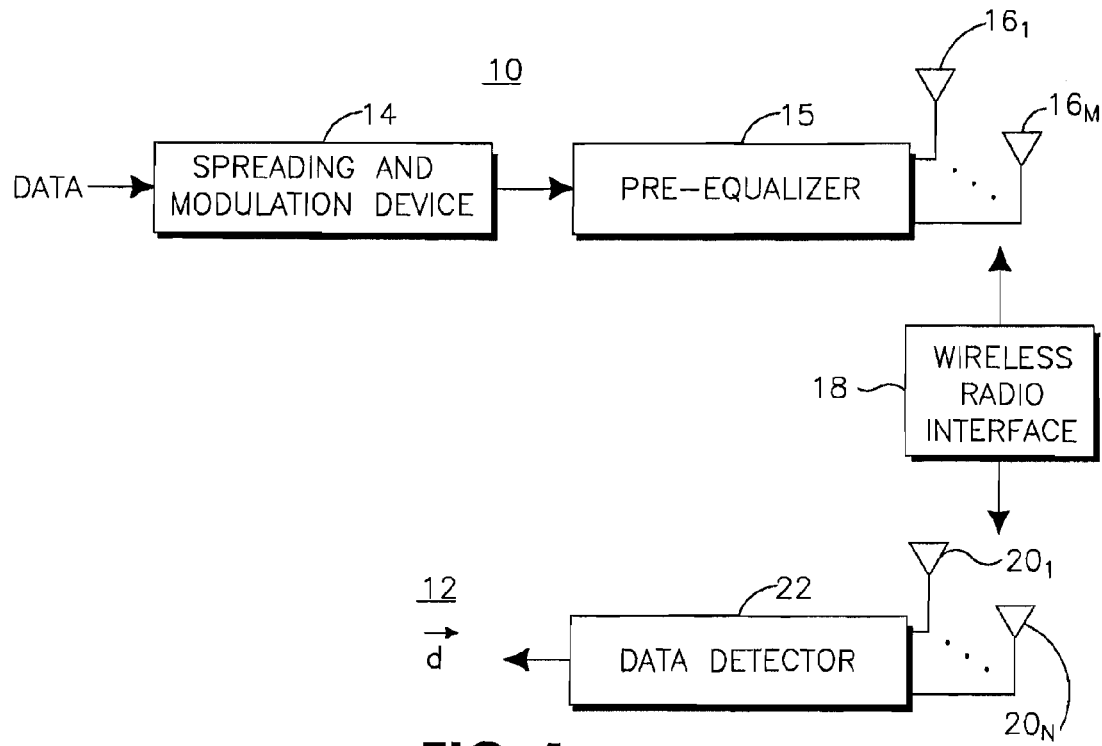
FIG. 1 is a simplified diagram of a transmitter and receiver using transmit processing using receiver functions.

FIG. 1 is a diagram of a simplified transmitter 10 and receiver 12 for use in transmit processing using receiver functions. The transmitter 10 can be located at a base station, user equipment (UE) or both, and the receiver 12 can be located at a UE, base station or both. Data to be communicated from the transmitter 10 to the receiver 12 is input into a spreading and modulation device 14 and a pre-equalizer 15. The data can be for a single code transmission to a single receiver, for a multi-code transmission to a single receiver, single code transmissions to multiple receivers, multi-code transmissions to multiple receivers or a combination of single and multi-code transmissions to multiple receivers.

The data is spread using the appropriate code(s), pre-equalized to compensate for the anticipated channel responses of the wireless radio interface 18 and modulated, such as by using quadrature phase shift keying (QPSK), M-ary quadrature amplitude modulation (QAM) or other modulation schemes, and to upconvert to radio frequency. The radio frequency signal is radiated by an antenna or M element antenna array $16_1$-$16_M$ through a wireless radio interface 18.

An antenna, or N element antenna array $20_1$-$20_N$, at the receiver 12 receives the radiated signal with other signals and noise as a received vector $\vec{r}$. A data detector 22 processes the received vector to recover the data $\vec{d}$. The structure of the data detector 22 may be simplified over a typical joint detection receiver due to the pre-equalization at the transmitter 10, such as by being implemented by code matched filters.

The transmitter 10 effectively compensates for the channel distortion prior to transmission. As a result, the received vector $\vec{r}$ is approximately the spread data vector $\vec{s}$.

The pre-equalization makes use of the channel and code information available at a receiver 12 to process the transmit vector appropriately so that when that signal is received at the receiver 12 it is already compensated for channel impairments. The channel information can be signaled from the receiver 12, may be derived from signals received at the transmitter 10 within the same frequency spectrum. To illustrate, for a base station of a TDD/CDMA communication system, the channel information may be gathered in an uplink time slot for a subsequent downlink transmission time slot.

When processing at the transmitter 10 is used, the received signal obtained from Equation 20A:

$$\vec{r} = [A'_1 \ ... \ A'_M] \begin{bmatrix} \vec{d}_1 \\ \vdots \\ \vec{d}_M \end{bmatrix} + \vec{n};$$

Equation 20A

In terms of the channel and code matrices, Equation 20A becomes Equation 20B:

$$\vec{r} = [H'_1 \ ... \ H'_M] \begin{bmatrix} C_1 & & \\ & \ddots & \\ & & C_M \end{bmatrix} \begin{bmatrix} \vec{d}_1 \\ \vdots \\ \vec{d}_M \end{bmatrix} + \vec{n}$$

Equation 20B

The code matrix $C_1$ through $C_M$ can differ based on the transmission scheme. One such scheme is space code transmit diversity (SCTD), where each antenna is assigned a different transmission code. In some transmit diversity schemes the same code matrix is used for each antenna. One such scheme is transmit adaptive antennas (TxAA). Although transmit processing using receiver functions is described in conjunction with each antenna transmitting the same code matrix C, it is also applicable to systems where the code matrix varies by antenna using an analogous approach.

In some systems, the transmit data bits $\vec{d}_1$ through $\vec{d}_M$ can differ based on the transmission scheme, in particular whether transmit diversity is used. Although an analogous approach can be applied to systems having differing data vectors per antenna, the following is described in conjunction with each antenna transmitting the same data vector $\vec{d}$. For systems where the same data and code matrix is transmitted from each antenna, the system is modeled per Equation 21.

$$\vec{r} = [A'_1 \ ... \ A'_M] \begin{bmatrix} \vec{d} \\ \vdots \\ \vec{d} \end{bmatrix} + \vec{n}$$

$$= [H'_1 \ ... \ H'_M] \begin{bmatrix} C & & \\ & \ddots & \\ & & C \end{bmatrix} \begin{bmatrix} \vec{d} \\ \vdots \\ \vec{d} \end{bmatrix} + \vec{n}$$

$$= [H'_1 \ ... \ H'_M] \begin{bmatrix} C\vec{d} \\ \vdots \\ C\vec{d} \end{bmatrix} + \vec{n};$$

Equation 21

The transmit vector is shown by Equation 22:

$$\begin{bmatrix} C\vec{d} \\ \vdots \\ C\vec{d} \end{bmatrix};$$

Equation 22

The pseudo-inverse of H from the right is $H^H(HH^H)^{-1}$. The data signal after processing is transmitted with this pseudo-inverse. Accordingly, the transmitted signal $\vec{t}\,'$ is shown by Equation 23:

$$\vec{t}\,' = H^H(HH^H)^{-1}C\vec{d};\qquad\text{Equation 23}$$

The resulting received vector is shown in Equation 24:

$$\vec{r} = HH^H(HH^H)^{-1}C\vec{d}\qquad\text{Equation 24}$$
$$= C\vec{d};$$

If the pre-equalization is ideal, a clean signal is received 12 at the receiver without any need for further processing. However, in practice due to noise and variations in the channel conditions, typically some degradation to the received signal occurs. However, the required processing to remove degradation is greatly decreased, further increasing the required complexity of the receiver 12.

One of the advantages of a MMSE or ZF type receiver is that MMSE or ZF circuits are commonly at the transmitter 10 site. To illustrate, a base station typically has an MMSE type receiver. Accordingly, a single MMSE circuit can be used for processing the received and transmitted data at the base station. As a result, the circuitry for a receiver 12 and a transmitter 10 implementing transmit processing using receiver functions can be consolidated into either the UE or the base station, with the other communicating unit having simplified circuitry.

For example, the base station may use the pre-equalization transmitter 10 and a MMSE receiver. The matrix or effective matrix inversion can be performed by the same circuit. As a result, the receiver circuitry at the UE can be simplified, such as a single or group of code matched filters. The simplified receiver circuitry also extends the battery life at the receiver 12.

The common used circuitry is not limited to MMSE or ZF receiver circuitry, but it is rather general in that any receiver 12 structure that is capable of performing matrix operations and calculating matrix inverse is suited to do processing at the transmitter 10. Another advantage of the pre-equalization is that the transmitted signal is focused on the receiver 12. For downlink signals in particular, the interference to other users is reduced.

Figure 2:
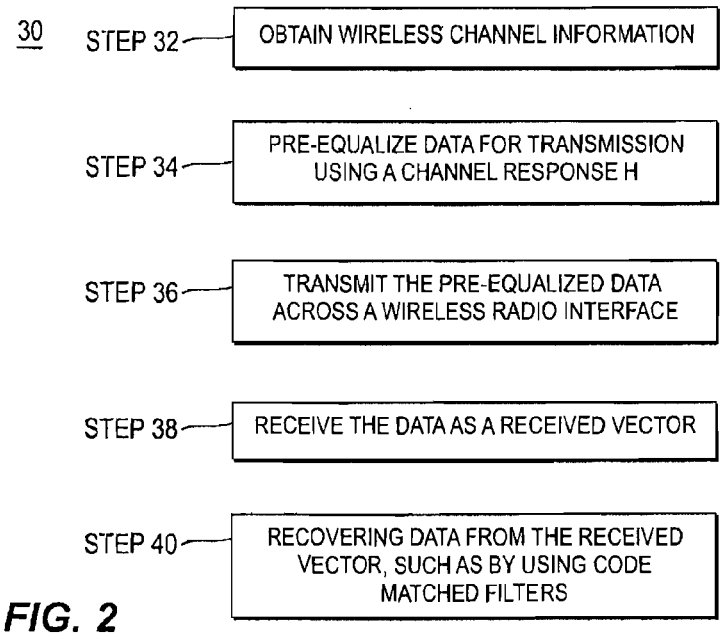
FIG. 2 is a flow chart of transmission using receiver functions.

Referring to FIG. 2, a method 30 is shown. The method commences with obtaining wireless channel information, which may be in the form of a channel impulse response H (step 32). The data for transmission is then pre-equalized using the channel impulse response H (step 34). The pre-equalized data is transmitted across the wireless radio interface (step 36) and is received as a received vector (step 38) at the receiver. The data is then recovered from the received vector, such as by using code matched filters (step 40).

What is claimed is:

1. A transmitter comprising:
    a spreading and modulation device configured to spread data using multiple codes; and
    a pre-equalizer configured to process the spread data with a channel response matrix to pre-equalize the spread data to compensate for a channel response prior to transmission, to receive channel and code information used by the pre-equalizer to equalize the spread data to compensate for channel impairments that the spread data will encounter upon transmission and to transmit the equalized spread data;
    wherein the pre-equalizer is configured to multiply the spread data by $H^H(HH^H+\sigma^2 I)^{-1}$, where H is the channel response matrix, $\sigma^2$ is a noise variance, and I is an identity matrix.

2. The transmitter of claim 1 wherein the channel and code information is gathered in an uplink time slot for a subsequent downlink transmission slot.

3. A method of transmitting data in code division multiple access communications, the method comprising:
    spreading data using multiple codes;
    receiving channel and code information;
    processing the spread data with a channel response matrix to pre-equalize the spread data to compensate for a channel response prior to transmission, wherein the spread data is equalized to compensate for channel impairments that the spread data will encounter upon transmission, wherein the spread data is multiplied by $H^H(HH^H+\sigma^2 I)^{-1}$, where H is the channel response matrix, $\sigma^2$ is a noise variance, and I is an identity matrix; and
    transmitting the equalized spread data.

4. The method of claim 3 wherein the channel and code information is gathered in an uplink time slot for a subsequent downlink transmission slot.

5. Apparatus for performing code division multiple access communications, the apparatus comprising:
    a receiver configured to transmit channel and code information; and
    a transmitter configured to spread data using multiple codes, process the spread data with a channel response matrix to pre-equalize the spread data to compensate for a channel response prior to transmission, to receive and use the channel and code information to equalize the spread data to compensate for channel impairments that the spread data will encounter upon transmission, and to transmit the equalized spread data to the receiver;
    wherein the spread data is multiplied by $H^H(HH^H+\sigma^2 I)^{-1}$, where H is the channel response matrix, $\sigma^2$ is a noise variance, and I is an identity matrix.

6. The apparatus of claim 5 wherein the channel and code information is gathered in an uplink time slot for a subsequent downlink transmission slot.

* * * * *